Figure 1:
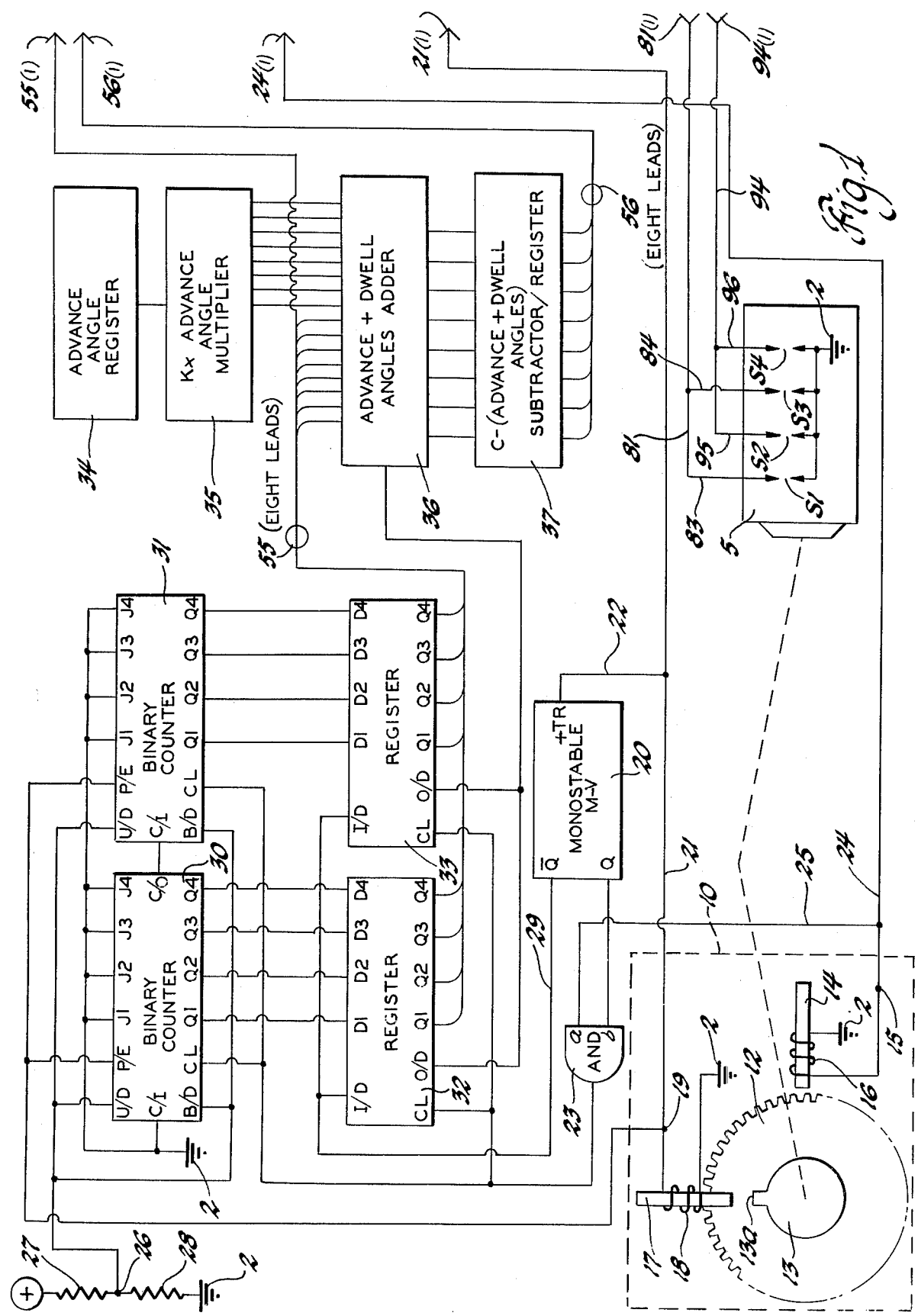

United States Patent [19]

Meloeny

[11] 4,265,211

[45] May 5, 1981

[54] DISTRIBUTORLESS INTERNAL COMBUSTION ENGINE IGNITION SYSTEM

[75] Inventor: Michael R. Meloeny, Troy, Mich.

[73] Assignee: General Motors Corporation, Detroit, Mich.

[21] Appl. No.: 96,836

[22] Filed: Nov. 23, 1979

[51] Int. Cl.³ .......................... F02P 9/00; F02P 3/12; F02P 5/00

[52] U.S. Cl. .................................... 123/643; 123/416; 123/609

[58] Field of Search ............... 123/609, 611, 416, 417, 123/414, 643

[56] References Cited

U.S. PATENT DOCUMENTS

| | | | |
|---|---|---|---|
| 3,921,610 | 11/1975 | Hardig | 123/643 |
| 4,009,699 | 3/1977 | Hedzler et al. | 123/416 |
| 4,198,936 | 4/1980 | Pagel et al. | 123/609 |
| 4,207,846 | 6/1980 | Borst et al. | 123/643 |
| 4,208,992 | 6/1980 | Polo | 123/416 |

*Primary Examiner*—Charles J. Myhre
*Assistant Examiner*—R. A. Nelli

*Attorney, Agent, or Firm*—Richard G. Stahr

[57] ABSTRACT

An internal combustion engine crankshaft reference signal pulse corresponding to a selected one engine cylinder pair and a series of crankshaft position signal pulses are generated during each crankshaft revolution and a crankshaft reference signal pulse corresponding to each other engine cylinder pair is synthesized during each crankshaft revolution. In response to each crankshft reference signal pulse and the subsequent crankshaft position signal pulses there is produced an ignition dwell signal effective to initiate ignition coil primary winding energization and later an ignition spark event signal that is effective to terminate ignition coil primary winding energization to thereby produce an ignition spark potential at the engine crankshaft angle at which an ignition spark event is to occur as calculated by an associated external data processor unit. The ignition spark potential produced upon each ignition coil primary winding deenergization is directed through direct wire connection to the spark plugs of the engine cylinder pair including the cylinder to be fired.

4 Claims, 2 Drawing Figures

DISTRIBUTORLESS INTERNAL COMBUSTION ENGINE IGNITION SYSTEM

This invention is directed to a distributorless internal combustion engine ignition system and, more specifically, to an ignition system of this type that is responsive to an engine crankshaft reference signal pulse corresponding to each engine cylinder pair and a subsequent series of engine crankshaft position signals for effecting ignition dwell and the production of an ignition spark potential at the engine crankshaft angle at which an ignition spark event is to occur that is directed through direct wire connection to the engine cylinder pair including the cylinder to be fired.

The ignition distributor presently employed with the internal combustion engines of motor vehicles adds additional weight to the vehicle, introduces ignition timing error as a result of gear lash inherent in the camshaft-distributor shaft meshed gear driving arrangement and mechanical wear and is subject to tampering. Therefore, the provision of a distributorless internal combustion engine ignition system that reduces vehicle weight, eliminates ignition spark error due to gear lash and mechanical wear and is substantially tamperproof is desirable.

It is, therefore, an object of this invention to provide an improved distributorless internal combustion engine ignition system.

It is another object of this invention to provide an improved distributorless internal combustion engine ignition system that is responsive to an engine crankshaft reference signal pulse corresponding to each engine cylinder pair and a subsequent series of engine crankshaft position signal pulses for effecting ignition dwell and the production of an ignition spark potential at the engine crankshaft angle at which an ignition spark event is to occur that is directed through direct wire connection to the engine cylinder pair including the cylinder to be fired.

In accordance with this invention, there is provided a distributorless internal combustion engine ignition system wherein circuitry responsive to an engine crankshaft reference signal pulse corresponding to each engine cylinder pair and a subsequent series of crankshaft position signal pulses effects ignition dwell and the production of an ignition spark potential at the engine crankshaft angle at which an ignition spark is to occur that is directed through direct wire connection to the engine cylinder pair including the cylinder to be fired.

Figure 2:
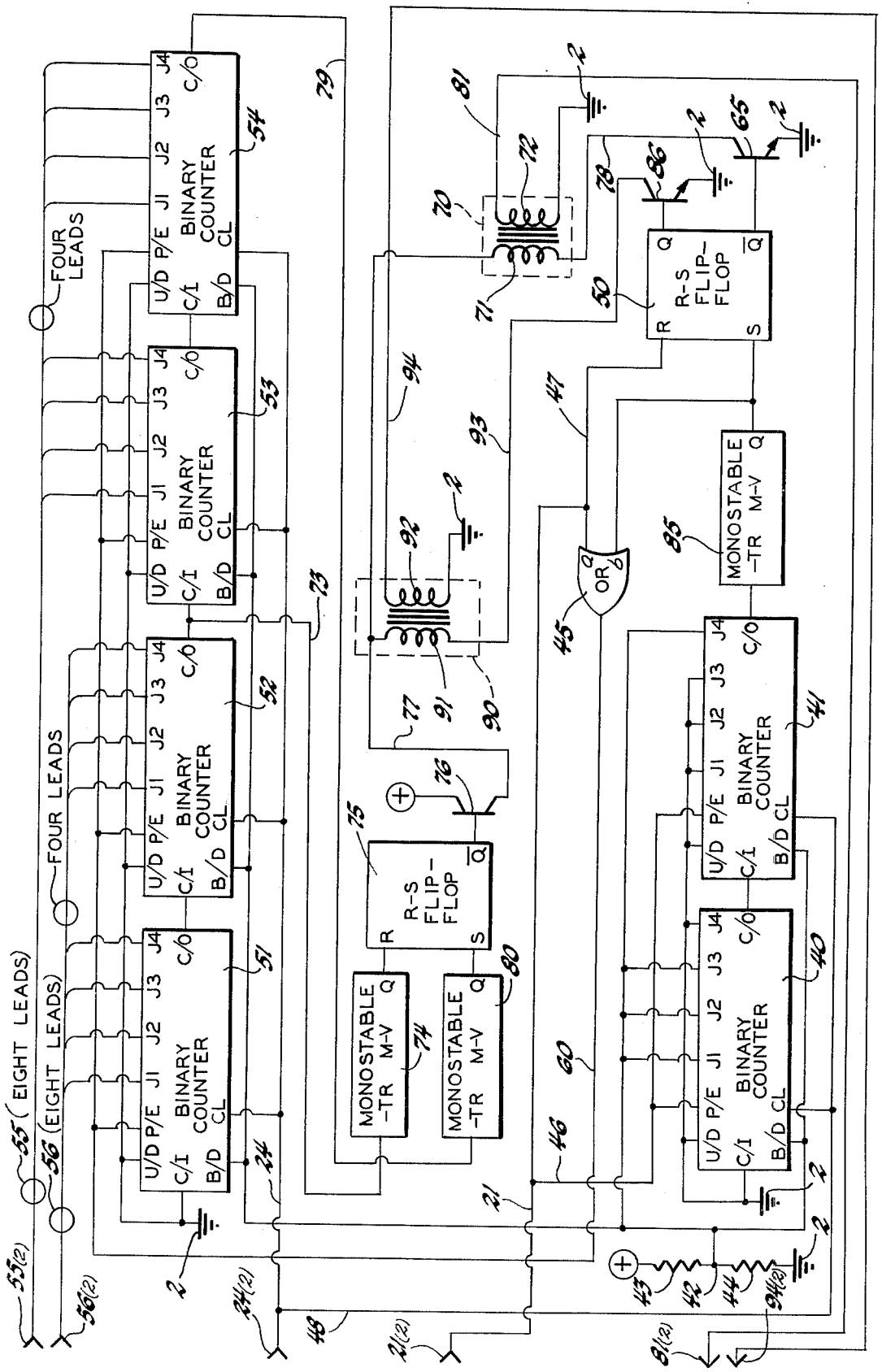

For a better understanding of the present invention, together with additional objects, advantages and features thereof, reference is made to the following description and accompanying drawing in which:

FIG. 1 sets forth partially in schematic and partially in block form auxiliary equipment that may be employed with the distributorless internal combustion engine ignition system of this invention; and FIG. 2 sets forth partially in schematic and partially in block form the distributorless internal combustion engine ignition system of this invention.

As point of reference or ground potential is the same point electrically throughout the system, it is illustrated in FIGS. 1 and 2 of the drawing by the accepted schematic symbol and is referenced by the numeral 2.

In the interest of reducing drawing complexity, specific operating potential connections to the various circuit elements set forth in FIGS. 1 and 2 are not shown. It is to be specifically understood, however, that during circuit operation, rated operating potential is supplied to the circuit elements of FIGS. 1 and 2 of the drawing as required. For those portions of the circuit in which it is desirable to illustrate a potential source, the positive polarity output terminal of any conventional direct current operating potential source having a grounded negative polarity output terminal, such as an automotive battery, is illustrated as a plus sign within a circle.

In accordance with logic terminology well known in the art, throughout this specification logic signals will be referred to as "High" or logic 1 and "Low" or logic 0 signals. For purposes of this specification, and without intention or inference of a limitation thereto, the "High" or logic 1 signals will be considered to be of a positive polarity potential and the "Low" or logic 0 signals will be considered to be of zero or ground potential.

The circuitry of FIGS. 1 and 2 employs eight conventional binary counter circuits, four conventional monostable multivibrator circuits, two conventional register circuits, two conventional R-S flip-flop circuits, a conventional AND gate and a conventional OR gate. As these circuit elements may be commercially available items well known in the art and, per se, form no part of this invention, each has been illustrated in block form in the drawing. Alternatively, these circuit elements may be formed on an integrated circuit chip. Furthermore, these devices are only examples of circuit elements suitable for use with the circuit of this invention, consequently, there is no intention or inference of a limitation thereto as other circuit elements having similar electrical characteristics may be substituted therefor without departing from the spirit of the invention.

One example of a binary counter circuit suitable for use with this invention is commercially marketed by RCA Corporation under the designation CD4029B. This counter circuit consists of a four-stage binary or BCD-decade up/down counter with provisions for look-ahead carry in both counting modes. The inputs consist of a single CLOCK, $\overline{\text{CARRY-IN}}$, BINARY/DECADE, UP/DOWN, PRESET ENABLE and four individual JAM terminals. Q1, Q2, Q3, Q4 and $\overline{\text{CARRY-OUT}}$ terminals are provided as outputs. A high PRESET ENABLE signal allows information on the JAM inputs to preset the counter at any state asynchronously with the CLOCK. A low on each JAM input, when the PRESET ENABLE signal is high, resets the counter to its zero count. The counter is advanced one count at the positive transition of the clock when the $\overline{\text{CARRY-IN}}$ and PRESET ENABLE signals are low. Advancement is inhibited when the $\overline{\text{CARRY-IN}}$ or PRESET ENABLE signals are high. The $\overline{\text{CARRY-OUT}}$ signal is normally high and goes low when the counter reaches the maximum count in the UP mode or the minimum count in the DOWN mode provided the CARRY-IN signal is low. The $\overline{\text{CARRY-IN}}$ signal in the low state can thus be considered a CLOCK ENABLE. Binary counting is accomplished when the BINARY/DECADE input is high and the counter counts up when the UP/DOWN input is high and down when the UP/DOWN input is low.

One example of a register circuit suitable for use with this invention is commercially marketed by the RCA Corporation under the designation CD4076BE. This 4-bit register includes D-type flip-flops that feature three-state outputs. A Data Disable input is provided to control the entry of data into the flip-flops. When the Data Disable input is low, data at the D inputs are loaded into their respective flip-flops on the next positive transition of the CLOCK input. An Output Disable input is also provided. When the Output Disable input is low, the normal logic states of the four outputs are available to the load.

One example of a monostable multivibrator circuit suitable for use with this invention is commercially marketed by RCA Corporation under the designation CD4047B. This multivibrator circuit may be triggered to the alternate state in which a logic 1 signal is present upon the "Q" output terminal and a logic 0 signal is present upon the "$\overline{Q}$" output terminal by the application of a leading edge pulse to the +TRIGGER input terminal or by the application of a trailing edge pulse to the −TRIGGER input terminal.

The R-S flip-flop circuits may be two conventional NOR gates cross-connected in a conventional manner. R-S flip-flop circuits of this kind produce a logic 0 signal upon the "Q" output terminal and a logic 1 signal upon the "$\overline{Q}$" output terminal upon the application of a logic 1 signal to the "R" input terminal and a logic 1 signal upon the "Q" output terminal and a logic 0 upon the "$\overline{Q}$" output signal upon the application of a logic 1 signal to the "S" input terminal, as is well known in the art.

The AND gate and the OR gate may be any conventional circuit element of the type well known in the art.

To produce a crankshaft reference signal pulse at a selected reference crankshaft angle relative to the top dead center position of the pistons of a selected pair of cylinders of engine 5 of FIG. 1, a crankshaft reference signal pulse generator and a crankshaft position signal pulse generator combination 10 of FIG. 1 may be employed. Included in this combination is a circular disk member 12 of a magnetic material having a plurality of teeth about the periphery thereof. In the interest of reducing drawing complexity, only a few representative teeth have been shown in the drawing. Disk member 12 is preferably mounted upon and rotated by the engine 5 crankshaft but may be mounted upon and rotated by any other engine 5 shaft that is rotated at a speed equal to engine crankshaft speed. Carried upon and rotated with disk member 12 is a pole piece 13 of a magnetic material having a salient pole tip 13a corresponding to a selected pair of engine 5 cylinders. A permanent magnet 14 having a crankshaft position signal pulse pickup coil 16 wound thereupon is located in magnetic coupling relationship with the teeth about the periphery of disk member 12 and another permanent magnet 17 having a crankshaft reference signal pulse pickup coil 18 wound thereupon is located in magnetic coupling relationship with salient pole tip 13a. As disk member 12 and pole piece 13 are rotated at engine crankshaft speed, therefore, a series of crankshaft position signal pulses are induced in pickup coil 16 during each crankshaft revolution that appear upon the output circuit which may be a terminal 15 and a crankshaft reference signal pulse is induced in pickup coil 18 during each crankshaft revolution that appears upon the output circuit which may be a terminal 19. Pole piece 13 is so oriented that when the salient pole tip 13a thereof is adjacent permanent magnet 17, the crankshaft reference signal pulse is induced in pickup coil 18 at a selected reference crankshaft angle relative to the top dead center position of the piston of the selected pair of engine cylinders. This selected reference crankshaft angle may be precisely at piston top dead center or at any other selected angle relative to piston top dead center. For purposes of this specification, this crankshaft reference signal pulse will be considered to be produced at the top dead center position of the pistons of the selected pair of engine cylinders. Although there may be any desirable number of teeth about the periphery of disk member 12, for purposes of this specification, it will be assumed that this number is 270. As disk member 12 and pole piece 13 are rotated by engine 5, therefore, a crankshaft reference signal pulse corresponding to a selected pair of engine cylinders and 270 crankshaft position signal pulses are produced during each engine crankshaft revolution. It is to be specifically understood, however, that optical sensors or any other type sensor or any combination thereof may be substituted for the illustrated magnetic crankshaft reference signal pulse generator and crankshaft position signal pulse generator combination without departing from the spirit of the invention.

For proper operation of the distributorless internal combustion engine ignition system of this invention, it is necessary that there be provided a binary code representation of ignition dwell in crankshaft position signal pulse counts for all engine speeds, a binary code representation of ignition spark advance crankshaft angle in crankshaft position signal pulse counts relative to piston top dead center at which an ignition spark event is to occur, and a binary code representation of not ignition dwell in crankshaft position signal pulse counts as determined by the difference between the number of crankshaft position signal pulses occurring during a crankshaft revolution divided by the number of pairs of engine cylinders less the sum of the binary code representations of ignition spark advance crankshaft angle and ignition dwell. The not ignition dwell crankshaft binary code representation will be described and defined in detail later in this specification.

To produce a binary code representation of ignition dwell in crankshaft position signal pulse counts for all engine speeds, each crankshaft reference signal pulse induced in pickup coil 18 is applied through leads 21 and 22 to the +TRIGGER input terminal +TR of monostable multivibrator circuit 20 to trigger this device to the alternate condition of operation in which a logic 1 signal is present upon the "Q" output terminal and a logic 0 signal is present upon the "$\overline{Q}$" output terminal. The ignition dwell time desired for the engine with which the distributorless internal combustion engine ignition system of this invention is employed is empirically determined. In the actual embodiment, the ignition dwell time was determined to be of the order of 5 milliseconds. Consequently, the monostable multivibrator circuit 20 timing circuit is designed in a manner well known in the art to provide a 5 millisecond logic 1 output signal pulse upon the "Q" output terminal thereof that is applied to the "b" input terminal of AND gate 23 to enable this gate. As the crankshaft position signal pulses induced in pickup coil 16 are applied through leads 24 and 25 to the "a" input terminal of AND gate 23, these crankshaft position signal pulses are gated through AND gate 23 during the 5 millisecond duration of the logic 1 output signal upon the "Q" output terminal of monostable multivibrator circuit 20 and are applied as clock pulses to the clock input terminal CL of each of binary counter circuits 30 and 31 and of each of register circuits 32 and 33. As the UP/DOWN input terminal U/D of each of counter circuits 30 and 31 is connected to junction 26 between series resistors 27 and 28, these binary counter circuits are conditioned to count up. As each of the "D" input terminals of register circuits 32 and 33 are connected to a corresponding "Q" output terminal of respective binary counter circuits 30 and 31 and the logic 0 signal present upon the "Q̄" output terminal of monostable multivibrator circuit 20 is applied to the Data Input Disable Input terminals I/D of register circuits 32 and 33 through lead 29, the count of crankshaft position signal pulses occurring during the 5 millisecond logic 1 output signal of monostable multivibrator circuit 20 are counted up by binary counter circuits 30 and 31 and are down loaded into register circuits 32 and 33 at the positive transition of each of the clock pulses. Consequently, at the termination of the 5 millisecond logic 1 output signal pulse of monostable multivibrator circuit 20, the number of crankshaft position signal pulses counted during that time period are loaded into register circuits 32 and 33. As the crankshaft position signal pulses are counted for a period of five milliseconds at all engine speeds, the binary number contained in register circuits 32 and 33 at the termination of the five millisecond output pulse upon the "Q" output terminal of monostable multivibrator circuit 20 in the binary code representation of ignition dwell in crankshaft position signal pulse counts at all engine speeds. It is to be specifically understood, however, that ignition dwell at all engine speeds may be determined by other methods without departing from the spirit of the invention as all that is required is that a binary code representation in crankshaft position signal pulse counts be provided.

The binary code representation in crankshaft position signal pulse counts of ignition spark advance crankshaft angle relative to piston top dead center at which an ignition spark event is to occur and of not ignition dwell may be derived from a calculated binary code representation of ignition spark advance crankshaft angle. One arrangement and without intention or inference of a limitation thereof for calculating an ignition spark advance crankshaft angle relative to piston top dead center at which an ignition spark event is to occur for each engine cylinder as determined by selected engine operating parameters and ambient operating conditions may be an electronic data processor unit such as that disclosed and described in U.S. Pat. No. 4,009,699, Hetzler et al, that issued Mar. 1, 1977 and is assigned to the same assignee as is this invention. In a manner described in detail in this patent, the disclosed electronic data processor unit calculates an ignition spark advance crankshaft angle relative to piston top dead center and produces a binary code representation thereof in an output ignition spark timing angle register. Advance angle register 34 of FIG. 1 corresponds to the output ignition spark timing angle register of the aforementioned patent.

Advance angle register 34, the Kx advance angle multiplier 35, the advance+dwell angles adder 36 and the C− (advance+dwell angles) subtractor/register 37 may be arithmetic logic circuitry well known in the art. Alternatively, a commercially available electronic microprocessor unit such as that marketed by Motorola Semiconductor Products, Inc. under the designation MC6800 may be programmed in a manner well known in the art to perform these arithmetic functions. Briefly, the electronic microprocessor is programmed to periodically perform a sub-routine that is effective to convert the calculated binary code representation of ignition spark advance angle contained in advance angle register 34 to a binary code representation of ignition spark advance crankshaft angle in crankshaft position signal pulse counts, to add the binary code representations of ignition spark advance crankshaft angle and ignition dwell in crankshaft position signal pulse counts and to produce a binary code representation of not ignition dwell in crankshaft position signal pulse counts. During each hereinabove described sub-routine, (1) the Kx advance angle multiplier circuit 34 converts the binary code representation of ignition spark advance contained in advance angle register 34 to a binary code representation of ignition spark advance crankshaft angle in crankshaft position signal pulse counts relative to piston top dead center at which an ignition spark event is to occur by multiplying the binary code representation contained in advance angle register 34 by a constant "K" that is the ratio between the number of teeth about the periphery of disk member 12 to 360°;(2) the advance+dwell angles adder 36 adds the binary code representation of ignition spark advance crankshaft angle in crankshaft position signal pulse counts contained in multiplier circuit 35 and the binary code representation of ignition dwell in crankshaft position signal pulse counts contained in registers 32 and 33; and (3) C− (advance+dwell angles) subtractor/register 37 subtracts the sum of the binary code representations of ignition spark advance crankshaft angle and ignition dwell from a constant "C" that is equal to the number of crackshaft position signal pulses occurring during a crankshaft revolution divided by the number of pairs of engine cylinders.

For purposes of this specification, it will be assumed that the number of teeth about the periphery of disk member 12 is 270 and that engine 5 is a four-cylinder engine. As the constant "K" is the ratio between the number of teeth about the periphery of disk member 12 to 360°, the numerical value of the constant "K" by which the binary code representation of ignition spark advance is multiplied is equal to 270 divided by 360° or 0.75. As there are two engine cylinder pairs in a four-cylinder engine and there are 270 teeth about the periphery of disk member 12, the numerical value of the constant "C" from which the sum of the binary code representations of ignition spark advance crankshaft angle and ignition dwell is subtracted is equal to 270 divided by 2 or 135. The resulting binary code number is a binary code representation of not ignition dwell in crankshaft position signal pulse counts. This representation of not ignition dwell is the crankshaft angle between each crankshaft reference signal pulse and the crankshaft angle at which ignition dwell is to be initiated and is determined by the difference between the number of crankshaft position signal pulses occurring during a crankshaft revolution divided by the number of pairs of engine cylinders less the sum of the binary code representations of ignition spark advance crankshaft angle and ignition dwell.

To synthesize a crankshaft reference signal pulse at the same selected reference crankshaft angle relative to piston top dead center of the pistons of each other pair of engine cylinders in response to the crankshaft position signal pulses, binary counter circuits 40 and 41 of FIG. 2 are provided. As the UP/DOWN input terminal U/D of each of binary counter circuits 40 and 41 is connected to point of reference or ground potential 2, these binary counter circuits are conditioned to count down. As there are 270 teeth about the periphery of disk member 12, with a four-cylinder engine there are 135 teeth or crankshaft position signal pulse counts between the top dead center positions of the cylinders of the respective engine cylinder pairs. Consequently, the binary number 135 or 11100001 where the extreme righthand bit is the most significant bit, is arranged to be entered into binary counters 40 and 41 at times to be later explained in detail in this specification. To provide for the loading of the binary code representation of 135 into binary counters 40 and 41, the JAM input circuit terminals J1, J2 and J3 of binary counter 40, and J4 of binary counter 41 are connected to junction 42 between series resistors 43 and 44 connected across the positive polarity output terminal of the operating potential source, as indicated by a plus sign within a circle, and point of reference or ground potential 2. The remainder of the JAM input terminals of binary counters 40 and 41 are connected to point of reference or ground potential 2. With this arrangement, upon the application of a logic 1 signal to the PRESET ENABLE input terminal P/E, the logic signal present upon each of the JAM input circuit terminals is loaded into the counter. In this case, the binary number 11100001 is loaded into binary counters 40 and 41.

The crankshaft reference signal pulses induced in pickup coil 18 of FIG. 1 are applied through lead 21, circuit points 21(1) of FIG. 1 and 21(2) of FIG. 2 and thence through the FIG. 2 extension of lead 21 to the "a" input terminal of conventional OR gate 45, through lead 46 to the P/E input terminal of each of binary counter circuits 40 and 41 and through lead 47 to the "R" input terminal of R-S flip-flop circuit 50.

The crankshaft position signal pulses induced in pickup coil 16 of FIG. 1 are applied through lead 24, circuit points 24(1) of FIG. 1 and 24(2) of FIG. 2 and thence through the FIG. 2 extension of lead 24 to the CLOCK input terminal CL of each of binary counter circuits 51, 52, 53 and 54 and through lead 48 to the CLOCK input terminal CL of each of binary counter circuits 40 and 41.

The binary code representation of ignition dwell in crankshaft position signal pulse counter contained in register circuits 32 and 33 of FIG. 1 is applied through eight leads 55, circuit points 55(1) of FIG. 1 and 55(2) of FIG. 2 and the FIG. 2 extension of the eight leads 55 to the JAM input circuit terminals of binary counter circuits 53 and 54.

The binary code representation of not ignition dwell in crankshaft position signal pulse counts present in the subtractor/register circuit 37 of FIG. 1 is applied through eight leads 56, circuit points 56(1) of FIG. 1 and 56(2) of FIG. 2 and the FIG. 2 extension of eight leads 56 to the JAM input terminal of binary counter circuits 51 and 52.

Upon the induction in pickup coil 18 of FIG. 1 of an engine crankshaft reference signal pulse corresponding to the selected engine cylinder pair, this crankshaft reference signal pulse is applied through the hereinabove described circuitry to the PRESET ENABLE input terminal P/E of each of binary counter circuits 40 and 41, to the "R" input terminal of R-S flip-flop circuit 50 and to the "a" input terminal of conventional OR gate 45 through which it is gated and applied through lead 60 to the PRESET ENABLE input terminal P/E of each of binary counter circuits 51, 52, 53 and 54. Upon the occurrence of this crankshaft reference signal pulse, therefore, the binary code representation of 135 crankshaft position signal pulse counts present upon the JAM input terminals of binary counter circuits 40 and 41 is loaded into these binary counter circuits, the binary code representation of not ignition dwell in crankshaft position signal pulse counts that is applied to the JAM input terminals of binary counter circuits 51 and 52 is loaded into these binary counter circuits, the binary code representation of ignition dwell in crankshaft position signal pulse counts that is applied to the JAM input terminals of binary counter circuits 53 and 54 is loaded into these binary counter circuits and R-S flip-flop circuit 50 is triggered to the operating condition in which a logic 1 signal is present upon the "$\overline{Q}$" output terminal and a logic 0 signal is present upon the "Q" output terminal. The logic 1 signal present upon the "$\overline{Q}$" output terminal of R-S flip-flop circuit 50 supplies base-emitter drive current to NPN transistor 65 to condition this device for collector-emitter conduction to thereby enable ignition coil primary winding 71 of ignition coil 70 for energization and binary counter circuits 40-41 and 50-52 begin to down count the binary code representation of 135 crankshaft position signal pulse counts and the binary code representation of not ignition dwell in crankshaft position signal pulse counts, respectively, in synchronism with the crankshaft signal position pulses applied through the previously described circuitry to the CLOCK input terminal CL of each. When the count in binary counter circuits 51 and 52 has reached zero indicating the conclusion of not ignition dwell, a logic 0 signal appears upon the $\overline{\text{CARRY-OUT}}$ output terminal C/O of binary counter circuit 52 and is applied through lead 73 to the $-$TRIGGER input terminal $-$TR of monostable multivibrator circuit 74 to trigger this device to the condition in which a logic 1 signal is present upon the "Q" output terminal thereof. This logic 1 output signal is applied to the "R" input terminal of R-S flip-flop circuit 75 to trigger this device to the condition in which a logic 1 signal is present upon the "$\overline{Q}$" output terminal thereof. This logic 1 output signal of R-S flip-flop circuit 75 supplies base-emitter drive current to NPN transistor 76 to render this device conductive through the collector-emitter electrodes thereof as the collector electrode is connected to the positive polarity output terminal of the associated source of operating potential as indicated by a plus sign within a circle. Upon the conduction of transistor 76, an energizing circuit for primary winding 71 of ignition coil 70 is completed and may be traced from the positive polarity output terminal of the associated source of operating potential as indicated by a plus sign within a circle, through the collector-emitter electrodes of NPN transistor 76, lead 77, primary winding 71 of ignition coil 70, lead 78, the collector-emitter electrodes of NPN transistor 65 that is conditioned for collector-emitter conduction and point of reference or ground potential 2 to the negative polarity output terminal of the associated supply potential source.

The logic 0 output signal upon the $\overline{\text{CARRY-OUT}}$ output terminal C/O of binary counter circuit 52 is also applied to the $\overline{\text{CARRY-IN}}$ input terminal C/I of binary counter circuit 53. Consequently, binary counter circuits 53 and 54 are conditioned to down count the binary code representation of ignition dwell in crankshaft position signal pulse counts in synchronism with the crankshaft position signal pulses applied through the previously described circuitry to the CLOCK input terminal CL of each. When the count in binary counter circuits 53 and 54 has reached zero, indicating the conclusion of ignition dwell, a logic 0 signal appears upon the CARRY-OUT output terminal C/O of binary counter circuit 54 and is applied through lead 79 to the −TRIGGER input terminal −TR of monostable multivibrator circuit 80 to trigger this device to the condition in which a logic 1 signal is present upon the "Q" output terminal thereof. This logic 1 output signal is applied to the "S" input terminal of R-S flip-flop circuit 75 to trigger this device to the condition in which a logic 0 signal is present upon the "Q̄" output terminal thereof. As this logic 0 signal does not supply base-emitter drive current to NPN transistor 76, this device goes not conductive to abruptly interrupt the previously described energizing circuit for primary winding 71 of ignition coil 70. Upon the abrupt interruption of this energizing circuit, an ignition spark potential is induced in secondary winding 72 and is applied through lead 81, circuit points 81(2) of FIG. 2 and 81(1) of FIG. 1, the FIG. 1 extension of lead 81 and respective leads 83 and 84 to the spark plugs of the engine cylinder pair including the cylinder to be fired in parallel. Assuming the firing order of engine 5 is 1-4-3-2 and that either of engine cylinders 1 or 3 is to be fired, this ignition spark potential is applied to spark plugs S1 and S3 of cylinders 1 and 3 of engine 5 in parallel.

After the ignition spark potential for engine cylinders 1 and 3 has been produced binary counter circuits 40 and 41 continue to down count the binary code representation of 135 crankshaft position signal pulses. When the count of binary counter circuits 40 and 41 reaches zero at the conclusion of 135 crankshaft position signal pulses, a logic 0 signal appears upon the CARRY-OUT output terminal of binary counter circuit 41 and the pistons of the cylinders of the other engine cylinder pair are at the selected reference crankshaft angle relative to the top dead center position, for purposes of this specification at the top dead center position, as there are 135 crankshaft position signal pulses in 180 crankshaft degrees. The logic 0 output signal of binary counter circuit 41 is applied to the −TRIGGER input terminal −TR of monostable multivibrator circuit 85 to trigger this device to the condition in which a logic 1 signal is present upon the "Q" output terminal thereof. This logic 1 output signal is the synthesized engine crankshaft reference signal pulse corresponding to the other engine cylinder pair.

Upon the appearance of this engine crankshaft reference signal pulse corresponding to the other engine cylinder pair upon the "Q" output terminal of monostable multivibrator circuit 85, this crankshaft reference signal pulse is applied to the "S" input terminal of R-S flip-flop circuit 50 and to the "b" input terminal of conventional OR gate 45 through which it is gated and applied through lead 60 to the PRESET ENABLE input terminal P/E of each of binary counter circuits 51, 52, 53 and 54. Upon the occurrence of this crankshaft reference signal pulse, therefore, the binary code representation of not ignition dwell in crankshaft position signal pulse counts that is applied to the JAM input terminals of binary counter circuits 51 and 52 is loaded into these binary counter circuits, the binary code representation of ignition dwell in crankshaft position signal pulse counts that is applied to the JAM input terminals of binary counter circuits 53 and 54 is loaded into these binary counter circuits and R-S flip-flop circuit 50 is triggered to the operating condition in which a logic 0 signal is present upon the "Q̄" output terminal and a logic 1 signal is present upon the "Q" output terminal. The logic 1 signal present upon the "Q" output terminal of R-S flip-flop circuit 50 supplies base-emitter drive current to NPN transistor 86 to condition this device for collector-emitter conduction to thereby enable ignition coil primary winding 91 of ignition coil 90 for energization and binary counter circuits 51 and 52 begin to down count the binary code representation of not ignition dwell in crankshaft position signal pulse counts in synchronism with the crankshaft signal position pulses applied through the previously described circuitry to the CLOCK input terminal CL of each. When the count in binary counter circuits 51 and 52 has reached zero indicating the conclusion of not ignition dwell, a logic 0 signal appears upon the CARRY-OUT output terminal C/O of binary counter circuit 52 and is applied through lead 73 to the −TRIGGER input terminal −TR of monostable multivibrator circuit 74 to trigger this device to the condition in which a logic 1 signal is present upon the "Q" output terminal thereof. This logic 1 output signal is applied to the "R" input terminal of R-S flip-flop circuit 75 to trigger this device to the condition in which a logic 1 signal is present upon the "Q" output terminal thereof. This logic 1 output signal of R-S flip-flop circuit 75 supplies base-emitter drive current to NPN transistor 76 to render this device conductive through the collector-emitter electrodes thereof as the collector electrode is connected to the positive polarity output terminal of the associated source of operating potential as indicated by a plus sign within a circle. Upon the conduction of transistor 76, an energizing circuit for primary winding 91 of ignition coil 90 is completed and may be traced from the positive polarity output terminal of the associated source of operating potential as indicated by a plus sign within a circle, through the collector-emitter electrodes of NPN transistor 76, lead 77, primary winding 91 of ignition coil 90, lead 93, the collector-emitter electrodes of NPN transistor 86 that is conditioned for collector-emitter conduction and point of reference or ground potential 2 to the negative polarity output terminal of the associated supply potential source.

The logic 0 output signal upon the CARRY-OUT output terminal C/O of binary counter circuit 52 is also applied to the CARRY-IN input terminal C/I of binary counter circuit 53. Consequently, binary counter circuits 53 and 54 are conditioned to down count the binary code representation of ignition dwell in crankshaft position signal pulse counts in synchronism with the crankshaft position signal pulses applied through the previously described circuitry to the CLOCK input terminal CL of each. When the count in binary counter circuits 53 and 54 has reached zero, indicating the conclusion of ignition dwell, a logic 0 signal appears upon the CARRY-OUT output terminal C/O of binary counter circuit 54 and is applied through lead 79 to the −TRIGGER input terminal −TR of monostable multivibrator circuit 80 to trigger this device to the condition in which a logic 1 signal is present upon the "Q" output terminal thereof. This logic 1 output signal is applied to the "S" input terminal of R-S flip-flop circuit 75 to trigger this device to the condition in which a logic 0 signal is present upon the "Q̄" output terminal thereof. As this logic 0 signal does not supply base-emitter drive current to NPN transistor 76, this device goes not conductive to abruptly interrupt the previously described energizing circuit for primary winding 91 of ignition coil 90. Upon the abrupt interruption of this energizing circuit, an ignition spark potential is induced in secondary winding 92 and is applied through lead 94, circuit points 94 (2) of FIG. 2 and 94 (1) of FIG. 1, the FIG. 1 extension of lead 94 and respective leads 95 and 96 to the spark plugs of the engine cylinder pair including the cylinder to be fired in parallel. Assuming the firing order of engine 5 is 1-4-3-2 and that either of engine cylinders 2 or 4 is to be fired, this ignition spark potential is applied to spark plugs S2 and S4 of cylinders 2 and 4 of engine 5 in parallel.

After the ignition spark potential for engine cylinders 2 and 4 has been produced, the engine continues to rotate disk member 12 of FIG. 1 until another engine crankshaft reference signal pulse corresponding to the selected engine cylinder pair is induced in pickup coil 18. Upon the occurrence of this crankshaft reference signal pulse, the sequence of events hereinabove described is repeated so long as engine 5 remains in the Run mode.

Regardless of the number of teeth about the periphery disk member 12 of FIG. 1, the same specific number of crankshaft position signal pulses is generated between each crankshaft reference signal pulse and the next succeeding crankshaft reference signal pulse. The binary code representation of ignition spark advance crankshaft angle in crankshaft position signal pulses is the crankshaft angle relative to piston top dead center at which at ignition spark event is to occur expressed in crankshaft position signal pulse counts relative to piston top dead center. The binary code representation of ignition dwell in crankshaft position signal pulses is the crankshaft angle over which ignition dwell is to be maintained expressed in crankshaft position signal pulse counts. The binary code representation of not ignition dwell is the remainder of the sum of the crankshaft position signal pulses expressing the ignition spark advance crankshaft angel plus the crankshaft position signal pulses expressing ignition dwell subtracted from the specific number of crankshaft position signal pulses generated between any two successive crankshaft reference signal pulses and, as will be explained later in this specification, is the crankshaft angle between each crankshaft reference signal pulse and the crankshaft angle at which ignition dwell is to be initiated expressed in crankshaft position signal pulse counts. Therefore, the sum of the crankshaft position signal pulse counts expressing the ignition spark advance crankshaft angle plus the crankshaft position signal pulse counts expressing ignition dwell plus the crankshaft position signal pulse counts expressing not ignition dwell is equal to the specific number of crankshaft position signal pulses generated between successive crankshaft reference signal pulses. As the binary code representation of not ignition dwell in crankshaft position signal pulse counts loaded into binary counters 51 and 52 of FIG. 2 upon the occurrence of each crankshaft reference signal pulse is initially down counted in synchronism with the crankshaft position signal clock pulses and ignition dwell is initiated upon this count reaching zero, as previously explained, the period of not ignition dwell is the crankshaft angle between each crankshaft reference signal pulse and the crankshaft angle at which ignition dwell is to be initiated expressed in crankshaft position signal pulse counts. Also upon the down count of the binary code representation of not ignition dwell reaching zero, the down count of the binary code representation of ignition dwell in crankshaft position signal pulse counts loaded into binary counters 53 and 54 upon the occurrence of each chankshaft reference signal pulse is initiated and this number is down counted in synchronism with the crankshaft position signal clock pulses and an ignition spark event is initiated upon this count reaching zero, as previously explained. As the down count of the binary code representation of not ignition dwell is initiated upon the occurence of each crankshaft reference signal pulse and the down count of the binary code representation of ignition dwell is initiated upon the down count of the binary code representation of not ignition dwell reaching zero, the sum of these binary code representations in crankshaft position signal pulse counts is effectively subtracted from the total of the crankshaft position signal pulse counts generated between successive crankshaft reference signal pulses. Consequently, the remainder of the crankshaft position signal pulse counts before the occurence of the next crankshaft position signal pulse is equal to the binary code representation of ignition spark advance crankshaft angle in crankshaft position signal pulses. For example, assume that engine 5 is operating at 2400 RPM, requires 12° ignition spark advance relative to piston top dead center at this speed, that the crankshaft reference signal pulses are produced at the piston top dead center, that an ignition dwell time of 5 milliseconds is required and that there are 270 teeth about the periphery of disk member 12 of FIG. 1. At 2400 engine RPM, there are 54 crankshaft position signal pulse counts entered into register circuits 32 and 33 of FIG. 1 during the 5 millisecond output pulse upon the "Q" output terminal of monostable multivibrator circuit 20. With 270 teeth about the periphery of disk member 12, the value of the constant "K" in the multiplier circuit 35 of FIG. 1 is 0.75 and the value of the constant "C" in subtractor/register 37 is 135, (270÷2 engine cylinder pairs). Consequently, the binary code representation of ignition spark advance crankshaft angle in crankshaft position pulse counts is 9, (12×0.75). The sum of the binary code representations of ignition spark advance crankshaft angle and dwell angle in crankshaft position signal pulse counts is equal to 54+9 or 63 crankshaft position signal pulse counts. The sum of the binary code representations of ignition spark advance crankshaft angle and dwell angle subtracted from the constant "C" is subtractor/register circuit 37 is 135 minus 63 leaving a remainder of 72 crankshaft position signal pulse counts of not ignition dwell. As the binary code representations of not ignition dwell and ignition dwell are initially down counted to zero in sequence, a total of 126 (72+54) crankshaft position signal pulse counts are required after each crankshaft reference signal pulse before binary counter circuits 53 and 54 are down counted to zero at which time an ignition spark event is initiated. As there are 135 crankshaft position signal pulses generated between successive crankshaft reference signal pulses and 126 crankshaft position pulses are required after each crankshaft reference signal pulse before an ignition spark event is initiated, the ignition spark event is initiated at 9 (135−126) crankshaft position signal pulse counts before piston top dead center which, translates into 12° ignition spark advance.

For the purpose of facilitating the description of the system of this invention, it was assumed that each crankshaft reference signal pulse was generated at piston top dead center of each engine cylinder pair. It is to be specifically understood that it is not necessary that the crankshaft reference signal pulses be generated at piston top dead center but may be generated at any selected desirable engine crankshaft angle relative to piston top dead center. However, should the crankshaft reference signal pulses be generated at an engine crankshaft angle other than piston top dead center, it is necessary that the ignition spark crankshaft angle contained in register circuit 34 of FIG. 1 be modified with respect to the crankshaft angle at which the crankshaft reference signal pulses are generated. For example, should the crankshaft reference signal pulses be generated at ten engine crankshaft degrees after top dead center and the engine 5 requires a 12° ignition spark advance, the binary code representation of 12° ignition spark advance contained in advance angle register 34 of FIG. 1 must be modified by the addition thereto of ten engine crankshaft degrees to compensate for the ten engine crankshaft degrees angle after top dead center at which the crankshaft position signal pulses occur.

Further, the distributorless ignition system of this invention is described in this specification with reference to a four-cylinder engine. It is to be specifically understood that this system is equally adaptable to engines having more or less cylinders.

While a preferred embodiment of the present invention has been shown and described, it will be obvious to those skilled in the art that various modifications and substitutions may be made without departing from the spirit of the invention that is to be limited only within the scope of the appended claims.

The embodiments of the invention in which an exclusive property or privilege is claimed are defined as follows:

1. A distributorless internal combustion engine ignition system for use with internal combustion engines of the type having at least four cylinders, a spark plug for each cylinder, a piston contained within each cylinder and a crankshaft mechanically coupled to each piston comprising:

means for producing a crankshaft reference signal pulse at a selected reference crankshaft angle relative to the top dead center position of the said pistons of a selected pair of said cylinders;

means for producing a predetermined number of crankshaft position signal pulses during each crankshaft revolution;

means responsive to said crankshaft position signal pulses for snythesizing a crankshaft reference signal pulse at the same said selected reference crankshaft angle relative to the top dead center position of the said pistons of each other pair of said cylinders;

means for producing a binary code representation of ignition spark crankshaft angle in crankshaft position signal pulse counts relative to piston top dead center at which an ignition spark event is to occur;

means for producing a binary code representation of ignition dwell in crankshaft position signal pulse counts for all engine speeds;

means for producing a binary code representation of not ignition dwell in crankshaft position signal pulse counts as determined by the different between the number of said crankshaft position signal pulses occurring during a crankshaft revolution divided by the number of pairs of said cylinders less the sum of said binary code representations of ignition spark angle and ignition dwell;

means responsive to said binary code representations of not ignition dwell and of ignition dwell, said crankshaft position signal pulses and said crankshaft reference signal pulses for effecting ignition coil primary winding energization when the number of said crankshaft position signal pulses occurring subsequent to each said crankshaft reference signal pulse is equal to said binary code representation of not ignition dwell and for effecting ignition coil primary winding deenergization when the number of said crankshaft position signal pulses occurring subsequent to each said crankshaft reference signal pulse is equal to the sum of said binary code representations of not ignition dwell and ignition dwell; and means for directing the ignition spark potential produced upon each ignition coil primary winding deenergization to the spark plugs of the cylinder pair including the cylinder to be fired.

2. A distributorless internal combustion engine ignition system for use with internal combustion engines of the type having at least four cylinders, a spark plug for each cylinder, a piston contained within each cylinder and a crankshaft mechanically coupled to each piston comprising:

means for producing a crankshaft reference signal pulse at a selected reference crankshaft angle before the top dead center position of the said pistons of a selected pair of said cylinders;

means for producing a predetermined number of crankshaft position signal pulses during each crankshaft revolution;

means responsive to said crankshaft position signal pulses for synthesizing a crankshaft reference signal pulse at the same said selected reference crankshaft angle before the top dead center position of the said pistons of each other pair of said cylinders;

means for producing a binary code representation of ignition spark advance crankshaft angle in crankshaft position signal pulse counts before piston top dead center at which an ignition spark event is to occur;

means for producing a binary code representation of ignition dwell in crankshaft position signal pulse counts for all engine speeds;

means for producing a binary code representation of not ignition dwell in crankshaft position signal pulse counts as determined by the difference between the number of said crankshaft position signal pulses occurring during a crankshaft revolution divided by the number of pairs of said cylinders less the sum of said binary code representations of ignition spark advance crankshaft angle and ignition dwell;

means responsive to said binary code representations of not ignition dwell and of ignition dwell, said crankshaft position signal pulses and said crankshaft reference signal pulses for effecting ignition coil primary winding energization when the number of said crankshaft position signal pulses occurring subsequent to each said crankshaft reference signal pulse is equal to said binary code representation of not ignition dwell and for effecting ignition coil primary winding deenergization when the number of said crankshaft position signal pulses occurring subsequent to each said crankshaft reference signal pulse is equal to the sum of said binary code representations of not ignition dwell and ignition dwell; and means for directing the ignition spark potential produced upon each ignition coil primary winding deenergization to the spark plugs of the cylinder pair including the cylinder to be fired.

3. A distributorless internal combustion engine ignition system for use with internal combustion engines of the type having at least four cylinders, a spark plug for each cylinder, a piston contained within each cylinder and a crankshaft mechanically coupled to each piston comprising:

means for producing a crankshaft reference signal pulse at a selected reference crankshaft angle relative to the top dead center position of the said pistons of a selected pair of said cylinders;

means for producing a predetermined number of crankshaft position signal pulses during each crankshaft revolution;

means responsive to said crankshaft position signal pulses for synthesizing a crankshaft reference signal pulse at the same said selected reference crankshaft angle relative to the top dead center position of the said pistons of each other pair of said cylinders;

means for producng a binary code representation of ignition spark crankshaft angle in crankshaft position signal pulse counts relative to piston top dead center at which an ignition spark event is to occur;

means for producing a binary code representation of ignition dwell in crankshaft position signal pulse counts for all engine speeds;

means for producing a binary code representation of not ignition dwell in crankshaft position signal pulse counts as determined by the different between the number of said crankshaft position signal pulses occurring during a crankshaft revolution divided by the number of pairs of said cylinders less the sum of said binary code representations of ignition spark crankshaft angle and ignition dwell;

means for producing an ignition spark potential for each pair of said engine cylinders, said means being of the type that produces an ignition spark potential upon the deactivation thereof subsequent to a prior activation;

means responsive to each of said crankshaft reference signal pulses for enabling the one of said means for producing an ignition spark potential that produces said ignition spark potential for the pair of said engine cylinders including the cylinder to be fired;

first means responsive to said crankshaft position signal pulses for producing a first output signal when the number of said crankshaft position signal pulses occurring subsequent to the last said crankshaft reference signal pulse is equal to said binary code representation of not ignition dwell;

second means responsive to said crankshaft position signal pulses for producing a second output signal when the number of said crankshaft position signal pulses occurring subsequent to the last said crankshaft reference signal pulse is equal to the sum of said binary code representations of not ignition dwell and ignition dwell;

means responsive to said first output signal for activating the enabled one of said means for producing an ignition spark potential and to said second output signal for deactivating said activated means for producing an ignition spark potential whereby an ignition spark potential is produced; and means for directing the last produced ignition spark potential to the spark plugs of the cylinder pair including the cylinder to be fired.

4. A distributorless internal combustion engine ignition system for use with internal combustion engines of the type having at least four cylinders, a spark plug of each cylinder, a piston contained within each cylinder and a crankshaft mechanically coupled to each piston comprising:

means for producing a crankshaft reference signal pulse at a selected reference crankshaft angle relative to the top dead center position of the said pistons of a selected pair of said cylinders;

means for producing a predetermined number of crankshaft position signal pulses during each crankshaft revolution;

means responsive to said crankshaft position signal pulses for synthesizing a crankshaft reference signal pulse at the same said selected reference crankshaft angle relative to the top dead center position of the said pistons of each other pair of said cylinders;

means for producing a binary code representation of ignition spark crankshaft angle in crankshaft position signal pulse counts relative to piston top dead center at which an ignition spark event is to occur;

means for producing a binary code representation of ignition dwell in crankshaft position signal pulse counts for all engine speeds;

means for producing a binary code representation of not ignition dwell in crankshaft position signal pulse counts as determined by the difference between the number of said crankshaft position signal pulses occurring during a crankshaft revolution divided by the number of pairs of said cylinders less the sum of said binary code representation of ignition spark crankshaft angle and ignition dwell;

means for producing an ignition spark potential for each pair of said engine cylinders, said means being of the type that produces an ignition spark potential upon the deactivation thereof subsequent to a prior activation;

means responsive to each of said crankshaft reference signal pulses for enabling the one of said means for producing an ignition spark potential that produces said ignition spark potential for the pair of said engine cylinders including the cylinder to be fired;

means responsive to said crankshaft position signal pulses for activating the enabled one of said means for producing an ignition spark potential when the number of said crankshaft position signal pulses occurring subsequent to the last said crankshaft reference signal pulse is equal to said binary code representation of not ignition dwell and for deactivating said activated means for producing an ignition spark potential when the number of said crankshaft position signal pulses occurring subsequent to the last said crankshaft reference signal pulse is equal to the sum of said binary code representations of not ignition dwell and ignition dwell whereby an ignition spark potential is produced; and means for directing the last produced ignition spark potential to the spark plugs of the cylinder pair including the cylinder to be fired.

* * * * *

UNITED STATES PATENT AND TRADEMARK OFFICE
CERTIFICATE OF CORRECTION

PATENT NO. : 4,265,211
DATED : May 5, 1981
INVENTOR(S) : Michael R. Meloeny

It is certified that error appears in the above-identified patent and that said Letters Patent are hereby corrected as shown below:

Column 3, line 29, after "of", "the" should read -- this --.
Column 5, line 8, the second "Input" should read -- input --.
Column 5, line 25, "in" should read -- is --.
Column 5, line 40, "thereof" should read -- thereto --.
Column 6, line 30, "crackshaft" should read -- crankshaft --.
Column 10, line 18, " "$\bar{Q}$" " should read -- "Q" --.
Column 10, line 22, " "Q" " should read -- "$\bar{Q}$" --.
Column 11, line 26, "at" should read -- an --.
Column 11, line 35, "angel" should read -- angle --.
Column 12, line 43, the first "is" should read -- in --.
Column 13, line 44, "snythesizing" should read -- synthesizing --.
Column 13, line 58, "different" should read -- difference --.
Column 16, line 6, "of" should read -- for --.
Column 16, line 36, "representation" should read -- representations --.

Signed and Sealed this

Twenty-fifth Day of August 1981

[SEAL]

Attest:

GERALD J. MOSSINGHOFF

Attesting Officer

Commissioner of Patents and Trademarks